April 7, 1925.  1,533,007

F. W. G. KAMMERER

ANTITHEFT DEVICE

Filed Feb. 25, 1924

Fred W. G. Kammerer
INVENTOR

BY *Victor J. Evans*
ATTORNEY

WITNESS: *Lynn Brodton*

Patented Apr. 7, 1925.

1,533,007

UNITED STATES PATENT OFFICE.

FRED WILLIAM GEORGE KAMMERER, OF BROOKLYN, NEW YORK.

ANTITHEFT DEVICE.

Application filed February 25, 1924. Serial No. 695,034.

*To all whom it may concern:*

Be it known that I, FRED W. G. KAMMERER, a citizen of the United States, residing at Brooklyn, in the county of Kings and State of New York, have invented new and useful Improvements in Antitheft Devices, of which the following is a specification.

This invention relates to anti-theft devices for use upon automobiles and is particularly designed for obscuring the view of the driver when the automobile is being operated by an unauthorized person.

The principal object of the invention is the provision of a blind or shield normally held concealed below the usual sun shield, but which may be lowered and locked by the owner of the automobile when parking the same whereby to obscure the vision from the drivers seat to prevent the steering of the automobile, there being suitable indicia on the shield to denote that a car driven with the shield in a lowered position is a stolen car.

Another object of the invention is to provide a device of the class mentioned which may be easily applied to automobiles now in use and which is simple in construction, cheap of manufacture and highly efficient for the purpose intended.

With these and other objects in view, the invention resides in certain novel construction and combination and arrangement of parts, the essential features of which are hereinafter fully described, are particularly pointed out in the appended claims, and are illustrated in the accompanying drawings, in which:—

Figure 1:
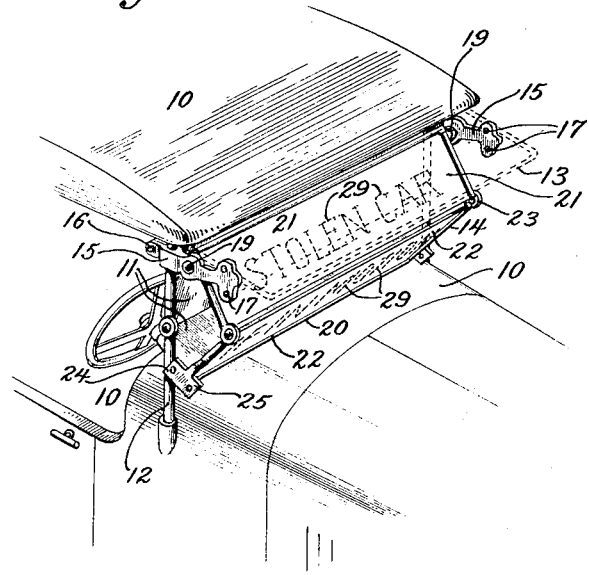
Figure 1 is a perspective view of the invention showing the shield or blind in a partially lowered position upon an automobile, the sun shield being shown in dotted line.
Figure 4:
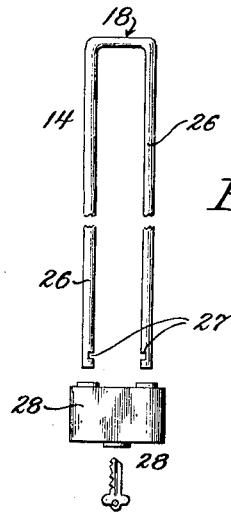
Figure 4 is a detail view of the supporting bracket.
Figure 5:
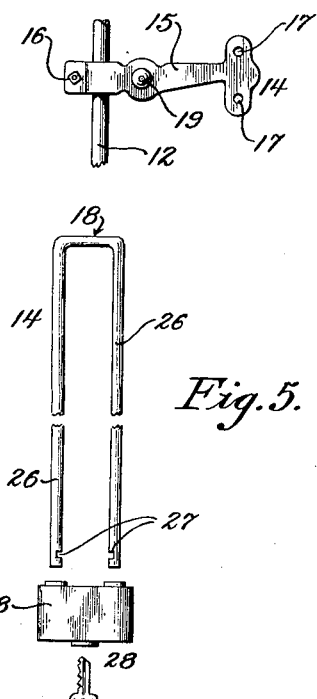
Figure 5 is a detail view of the locking means.

Referring more particularly to the drawings, the reference numeral 10 designates a portion of an automobile, 11 the usual transparent wind shield therefor and 12 a pair of spaced standards for supporting the transparent wind shield and 13 a sun shield mounted above the wind shield for shading the eyes of the driver from the glare of the sun. My invention in its entirety is indicated by the numeral 14 and is applied to the standards 12 in front of the wind shield in a manner now to be described.

Figure 2:
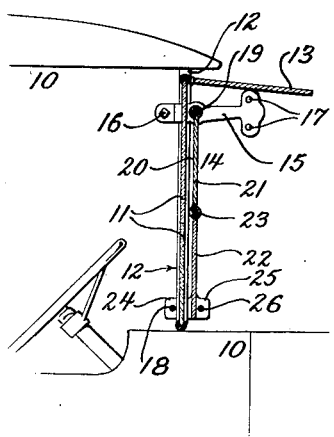
Figure 2 is a vertical sectional view showing the blind locked in its lowered position.

The invention consists of a pair of arms or brackets 15 having attaching means 16 thereon at one end for removably securing the arms to the standards 12. The outer end of the arms are provided with openings 17 which horizontally align with each other for receiving a locking means 18 to be hereinafter described. Pivoted as at 19 intermediate the ends of the arms is a blind or shutter 20 which comprises foldable sections 21 and 22 hingedly connected together as at 23. The sides of the section 22 at the free end thereof are provided with ears 24 and 25 having openings therein for the reception of the locking means 18 when the shutter is in operative position to cover the wind shield as shown in Figure 2 of the drawing.

The locking means 18 includes a U-shaped bolt or shackle 26 having its forked member provided with notches 27 for co-action with any suitable keyed actuated locked mechanism 28.

Figure 3:
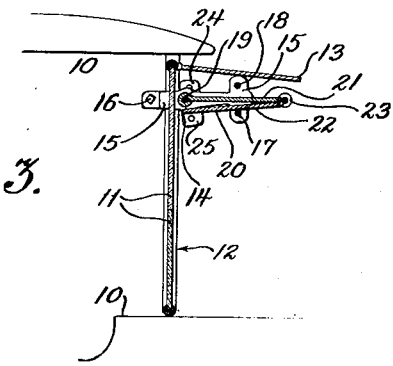
Figure 3 is a similar view but showing the blind in a raised position.

Under normal conditions when driving, the blind is folded into the position shown in Figure 3 of the drawing beneath the sun shield 13 whereby to conceal the same and is held in this position by the shackle passing over the outer sides of the sections 20 and 21 and through the opening 17 in the arms 15 after which the locking mechanism is applied to the shackle. When parking the automobile the lock is removed and the blind lowered to cover the entire wind shield. When the blind is in this position, the ears 24 project inwardly beyond the wind shield after which the shackle is inserted in the aligned openings in the ears 24 and 25 so that the shackle straddles the wind shield and its standards. After the shackle has been applied in this manner, the lock is connected therewith and prevents the raising of the blind or shutter by an unauthorized person. If desired the blind may have a suitable indicia 29 thereon such as "Stolen Car If In Motion," or the like to indicate that the driver should be stopped and turned over to the proper authorities. It will be noted that this indicia is concealed by the sun shield when the blind is in a raised position.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In combination with the wind shield structure of an automobile, a sun shield, a pair of arms, attaching means for securing said arms to said wind shield structure, a blind pivoted to said arms and comprising a pair of hingedly connected foldable sections, a locking device including a forked member for locking said section in a folded position beneath said sun shield or unfolded position, the forked member straddling the sections when in folded position and adapted to straddle one of said sections and the wind shield structure when in unfolded position, substantially as and for the purpose specified.

In testimony whereof I have affixed my signature.

FRED WILLIAM GEORGE KAMMERER.